United States Patent [19]

Biedenbach et al.

[11] Patent Number: 4,909,312

[45] Date of Patent: Mar. 20, 1990

[54] INTERFACE EQUIPMENT BETWEEN A HEAT PUMP AND A BURIED HEAT EXCHANGER

[76] Inventors: Homer M. Biedenbach, 486 Meadowcrest Rd., Cincinnati, Ohio 45231; Eugene L. Timperman, 10639 Silverbrook Dr., Cincinnati, Ohio 45240

[21] Appl. No.: 98,496

[22] Filed: Sep. 18, 1987

[51] Int. Cl.⁴ .................. F28D 15/00; F25B 27/00
[52] U.S. Cl. .................. 165/45; 165/104.32; 62/238.7; 62/260; 237/66
[58] Field of Search ............. 165/104.32, 45; 62/260, 62/238.7, 238.6; 237/66

[56] References Cited

U.S. PATENT DOCUMENTS

| | | | |
|---|---|---|---|
| 2,395,697 | 2/1946 | Tidd | 237/66 |
| 4,215,551 | 8/1980 | Jones | 62/260 |
| 4,325,228 | 4/1982 | Wolf | 165/45 |

Primary Examiner—Albert W. Davis, Jr.

[57] ABSTRACT

An interface assembly between a heat pump and an elongated ground heat exchanger. First and second valve means are connected to opposed end portions of the ground heat exchanger. A conduit of a coolant-to-heat transfer liquid heat exchanger in the heat pump, a tank column, and pump means between the second valve means and the first valve means are connected in series between the first and second valve means.

10 Claims, 5 Drawing Sheets

INTERFACE EQUIPMENT BETWEEN A HEAT PUMP AND A BURIED HEAT EXCHANGER

BACKGROUND OF THE INVENTION

This invention relates to earth coupled heat pump systems. More specifically, it relates to interface equipment installed between a water source heat pump and a closed loop buried heat exchanger.

An object of this invention is to provide interface equipment in modular form.

A further object of this invention is to provide interface equipment that can be all plastic in order to cooperate with present practice of using calcium chloride, glycols, or alcohols as antifreeze.

A further object of this invention is to provide equipment that can be used with or without visual instruments.

A further object of this invention is to reduce installation procedures to a minimum.

A further object of this invention is to provide full access to a closed loo buried heat exchanger for filling, purging, filtering, cleaning, antifreezing, and corrosion inhibition.

A further object of this invention is to prevent air from entering the buried heat exchanger loop during service.

A further object of this invention is to provide a system whose heat pump loop can be purged with an installed circulator pump.

A further object of this invention is to provide an appropriate arrangement that will minimize spillage during service.

Another object of this invention is to provide the system with an accumulator tank for extending the time required for the system to leak down.

Another object of this invention is to provide an accumulator tank that cannot enter air into the buried heat exchanger loop as the system leaks down to atmosphere or during setup procedures.

Another object of this invention is to provide the system with auto shutdown because of the loss of static pressure.

Another object of this invention is to provide a means for separating solid particles from the circulating fluid. Solid particles can be construction dirt, generated by corrosion, or the result of precipitation.

Another object of this invention is to provide a means from separating air from the circulating fluid.

BRIEF DESCRIPTION OF THE INVENTION

Briefly, this invention provides modular interface equipment between a heat pump assembly and a buried heat exchanger to provide simplicity of installation and the reliability of manufactured parts. All parts can be pressure tested at manufacture. The modular components allow for matching of pumping power of circulator pump with respect to system pressure drop. The system can be used blind, or with temperature and pressure instruments. A low pressure shutoff switch can protect the circulator pump from cavitating and running dry.

The modular interface equipment includes a first valve assembly connected to one end of a ground buried heat exchanger and a second valve assembly connected to an opposite end of the ground buried heat exchanger. An accumulator tank is connected between the first valve assembly and an end of a conduit of a heat exchanger of the heat pump assembly. A circulator pump is mounted between the second valve assembly and the other end of the conduit. Air can be held in the upper part of the accumulator tank forming a cushion permitting variatio of the pressure in the system. During normal operation of the system, valves in the valve assemblies are set to direct liquid from the circulator pump through the conduit of the heat exchanger of the heat pump assembly, through the accumulator tank, and through the ground buried heat exchanger back to the circulator pump. During servicing, valves of the valve assemblies are set to close off the ground buried heat exchanger, and the valve assemblies are connected together by a cross-over/bleed assembly provided with an air bleeding fitting. The circulator pump directs liquid through the conduit of the heat exchanger of the heat pump assembly, the accumulator tank, and the cross-over fitting back to the circulator pump. Heavy solid particles can settle to the bottom of the accumulator tank where a drain fitting at the bottom of the accumulator tank can be opened to release the heavy particles. Air can be bled from the crossover/bleed assembly through the air bleeding fitting. Additional liquid can be introduced through a valve at a low point in the system by pump action. Excess air can be removed from the accumulator tank through a bleed fitting therein spaced a selected distance from the top thereof.

The above and other objects and features of the invention will be apparent to those skilled in the art to which this invention pertains from the following detailed description and the drawings in which:

DETAILED DESCRIPTION OF PRESENTLY PREFERRED EMBODIMENT

Figure 1:
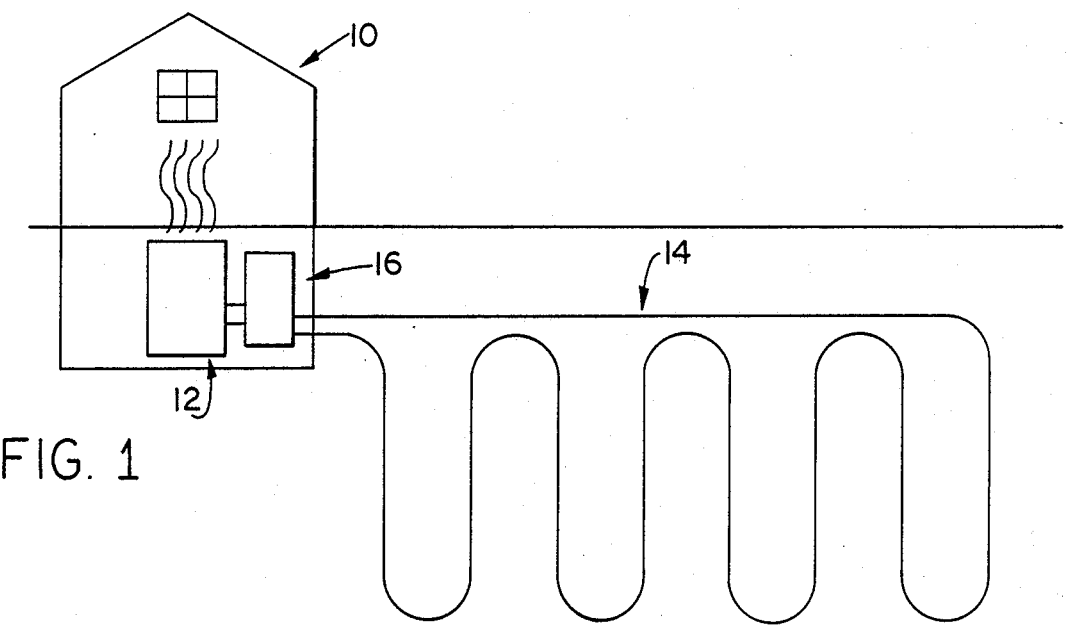
FIG. 1 is a schematic diagram showing required elements of a closed loop, earth coupled, water source heat pump system.

In the following detailed description and the drawings, like reference characters indicate like parts. FIG. 1 shows a building 10, a heat pump 12, a heat exchanger 14, and interface equipment 16. The heat exchanger 14 is a closed loop water system. In its most simplistic form, it is a long length of plastic tubing that is placed underground so that a heat transfer liquid can be circulated to and from the heat pump 12.

Figure 3:
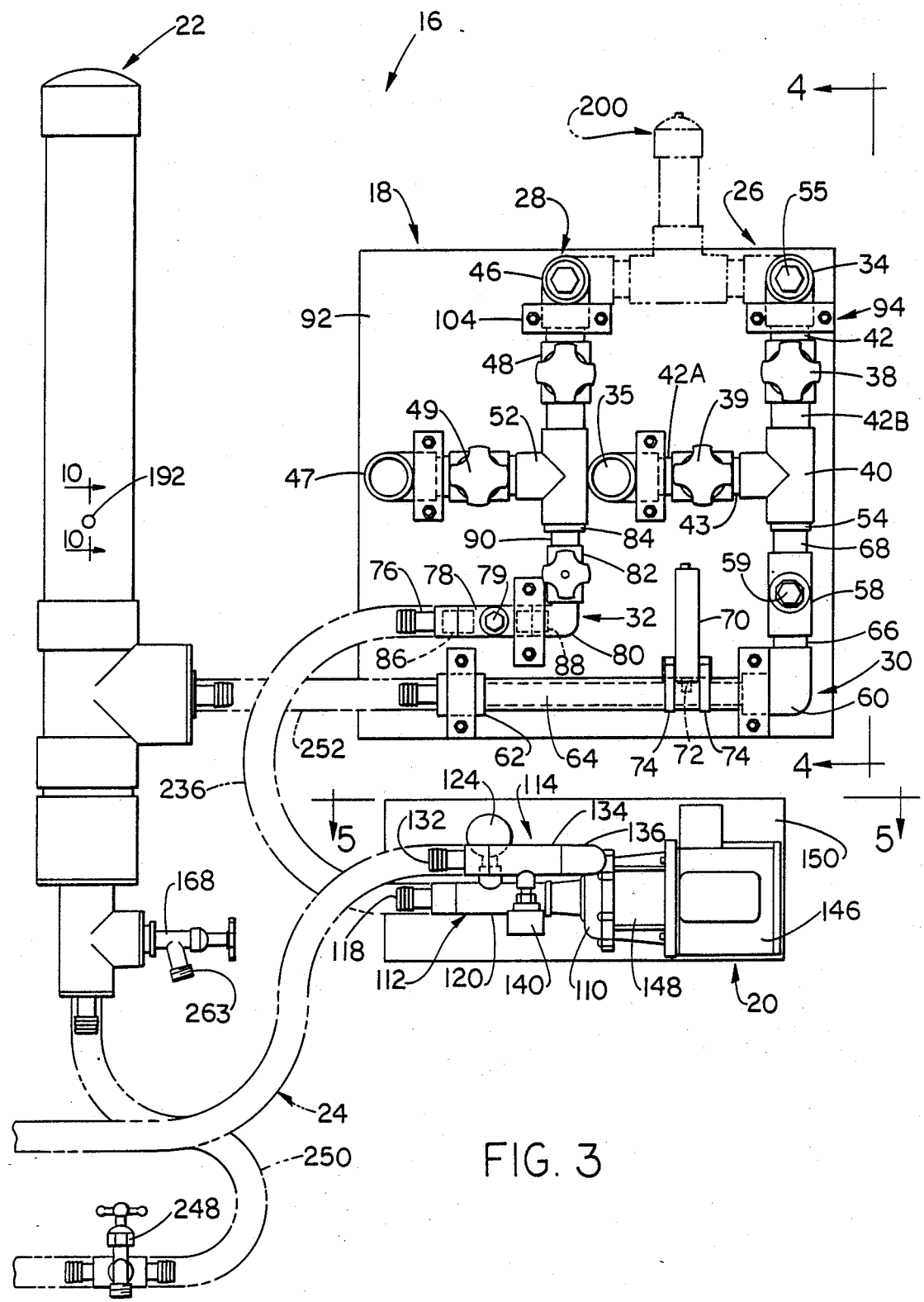
FIG. 3 is a view in upright elevation of modular interface equipment with rubber hose connections and a removable crossover/bleed assembly being shown in phantom.

The interface equipment 16 is comprised of a valve console, or module 18, a pump module 20, and a tank 22 constructed in accordance with a preferred embodiment of this invention as is shown in FIG. 3.

Valve Console

The valve console 18 is constructed of standard PVC pressure pipe and fittings. It is comprised of a right hand valve assembly 26, a left hand valve assembly 28, an output branch 30, and an input branch 32. The right hand valve assembly 26 incorporates two elbows 34 and 35, two gate valves 38 and 39, and a tee 40.

The elbow 34 incorporates an internal thread in one end and a socket at the other. An inlet and an outlet of the gate valve 38 incorporate sockets. The socket end of the elbow 34 is ridigly affixed to one end of a short length of pipe 42, while the other end of the pipe 42 is rigidly affixed into one of the sockets of the valve 38. (The term "rigidly affixed" herein means chemical welding by means of solvent glue.) The threaded socket of the elbow 34 can be closed by a removable threaded plug 55, as shown in FIG. 3.

The elbow 35 similarly includes an internal thread in one end and a socket at the other end. An inlet end and an outlet end of the gate valve 39 incorporates sockets. The socket end of the elbow 35 is rigidly affixed to an end of a short length of pipe 42A, while the other end of the short length of pipe 42A is rigidly affixed into one of the sockets of the valve 39. The threaded socket of the elbow 35 can be arranged to receive an end fitting (not shown) of a pipe 232 (FIG. 2) of the heat exchanger 14.

The gate valve 38, along with its elbow 34, is rigidly affixed to a short length of pipe 42B (FIG. 3) that is the turn rigidly affixed into an upstanding socket of the tee 40. The valve 39, along with its elbow 35, is similarly affixed to a short length of pipe 43 that is in turn ridigly affixed into a horizontally disposed branch of the tee 40.

The left hand valve assembly 28 incorporates two elbows 46 and 47, two gate valves 48 and 49, and a tee 52. The left hand valve assembly 28 is similar to the right hand valve assembly 26. A threaded socket of the elbow 47 can be arranged to receive an end fitting (not shown) of a pipe 230 of the heat exchanger 14.

The output branch 30 incorporates a reducing bushing 54, a tee 58, an elbow 60, and a barbed fitting 62. A socket end of the barbed fitting 62 is rigidly affixed to the left end of a horizontally disposed pipe 64, the right end thereof being rigidly affixed into a horizontally disposed socket of the elbow 60. An upstanding socket of the elbow 60 rigidly accommodates a short length of pipe 66 that is in turn rigidly affixed into a lower socket of the tee 58. An upstanding socket of the tee 58 rigidly accommodates another short length of pipe 68 that is in turn rigidly affixed into the reducing bushing 54. A horizontal arm of the tee 58 can be closed by a removable threaded plug 59. The reducing bushing 54 is rigidly affixed into a downwardly facing socket of the tee 40 of the right hand valve assembly 26. The pipe 64 incorporates a hole 72 in a top right portion thereof of accommodate an inwardly extending probe of a flow meter 70. The flow meter 70, which includes a base gasket, is fixedly attached to the pipe 64 with a pair of band clamps 74. If one wishes not to use the flow meter 70, a gasketed band (not shown) can be affixed around the pipe 64 covering the hole 72. The gasketed band can be held in place by the pair of band clamps 74.

The input branch 32 incorporates a barbed fitting 76, a tee 78, an elbow 80, a gate valve 82, and a bushing 84. A socket end of the barbed fitting 76 is rigidly affixed over the end of a short length of pipe 86, whose other end is rigidly affixed into the left end of the tee 78. A right end of the tee 78 is likewise rigidly affixed upon an end off a short length of pipe 88 that is in turn rigidly affixed into a socket end of the elbow 80. A side arm of the tee 78 can be closed by a threaded plug 79. The upward end of the below 80 is inserted into a downward extending socket of the gate valve 82 and rigidly affixed therein. An upper socket of the gate valve 82 is rigidly affixed onto the end of a short length of pipe 90 that is in turn rigidly affixed into the bushing 84. The bushing 84 is rigidly affixed within the downwardly extending of the tee 52 of the left hand valve assembly 28.

Figure 4:
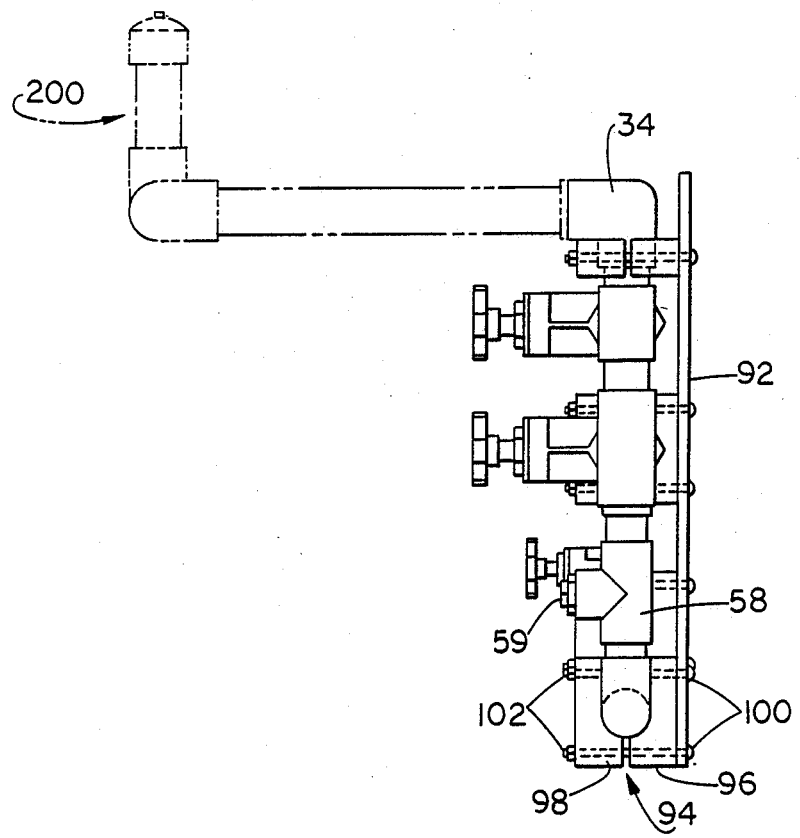
FIG. 4 is a side elevational view of a valve console taken in the direction of the arrow 4—4 in FIG. 3.

The right hand valve assembly 26 and the output branch 30 are fixedly attached to a board 92 with a set of three clamps 94. As can be seen in FIG. 4, each clamp 94 has a base 96 that performs as a cradle for the associated pipe or fitting. Each base has a cap 98 that is identical to its base. A pair of bolts 100 supports each clamp. The bolts pass through clear holes in the board 92, in the base 96, and in the cap 98. Nuts 102 are threadably affixed upon the ends of the bolts 100 to fixedly attach the output branch 30 and the right hand valve assembly 26 to the board 92.

The left hand valve assembly 28 and the input branch 32 are fixedly attached to the board 92 with a pair of clamps 104. The clamps 104 are of a construction similar to the clamps 94 and fixedly cradle their associated fittings.

The board 92 offers considerable free area through which an installer can fasten the valve console 18 to a wall or upstanding surface (not shown).

The tee fittings 58 and 78 permit installation of instrumentation (not shown) in the output branch 30 and the input branch 32, respectively.

Pump Module

Figure 5:
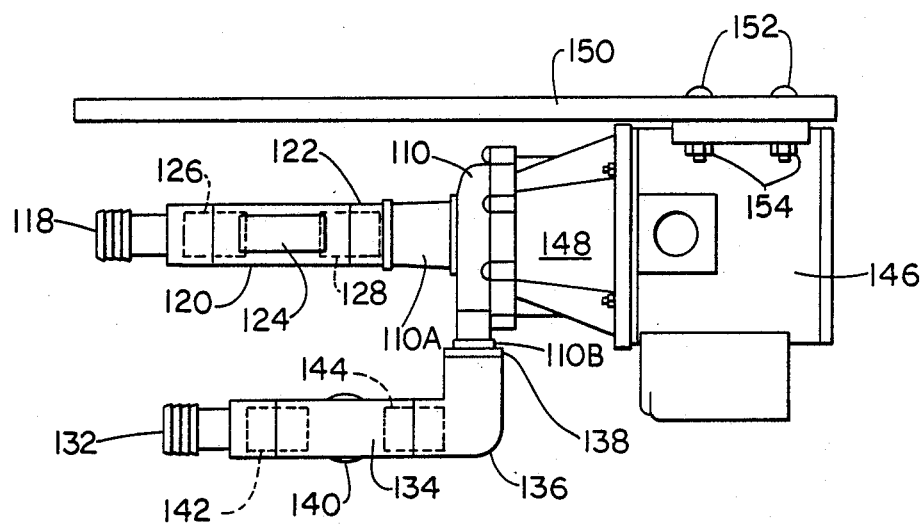
FIG. 5 is a plan view of a pump module taken in the direction of the arrows 5—5 of FIG. 3, hoses being omitted.

The pump module 20 is shown in FIGS. 3 and 5. It is comprised of a pump 110, an inlet assembly 112, an outlet assembly 114, and a board 150.

The inlet assembly 112 incorporates a barbed fitting 118, a tee 120, a male adapter 122, and a pressure gauge 124. The socket end of the barbed fitting 118 is rigidly affixed upon the end of a short length of pipe 126 whose other end is rigidly affixed into the left end of the tee 120. The right end of the tee 120 is rigidly affixed over the end of another short length of pipe 128 that is in turn rigidly affixed within the socket end of the male adapter 122. A threaded end of the male adapter 122 is appropriately turned into a threaded inlet 110A of the pump 110. The upstanding branch of the tee 120 provides threaded mounting for the pressure gauge 124.

The outlet assembly 114 is comprised of a barbed fitting 132, a tee 134, an elbow 136, a bushing 138, and a pressure switch 140. A socket end of the barbed fitting 132 is rigidly affixed upon one end of a short length of pipe 142 that is in turn rigidly affixed into the left end of the tee 134. The right end of the tee 134 is rigidly affixed upon a short length of pipe 144 that is in turn rigidly affixed into the left end of the elbow 136. The other end of the elbow 136 is rigidly affixed upon the male end of the bushing 138. The inside diameter of the bushing 138 is threaded and mounted upon male threads of a discharge extension 110B of the pump 110. The downwardly extending branch of the tee 134 provides threaded mounting for the pressure switch 140.

The impeller of the pump 110 is driven by a motor 146 through a magnetic coupling 148. This leaves the impeller and core of the magnetic coupling buried within the fluid system. The motor is mounted to a board 150 with a set of four bolts 152. The four bolts 152 pass through clear holes in the board 150 and through clear holes in mounting feet of the motor 146. A set of four nuts 154 compressively affix the motor to the board 150. The board 150 offers ample area through which the installer can pass a pair of screws for convenient attachment of the pump module 20 across a pair of studs, to a concrete wall, or to any other upstanding structure.

Tank

Figure 6:
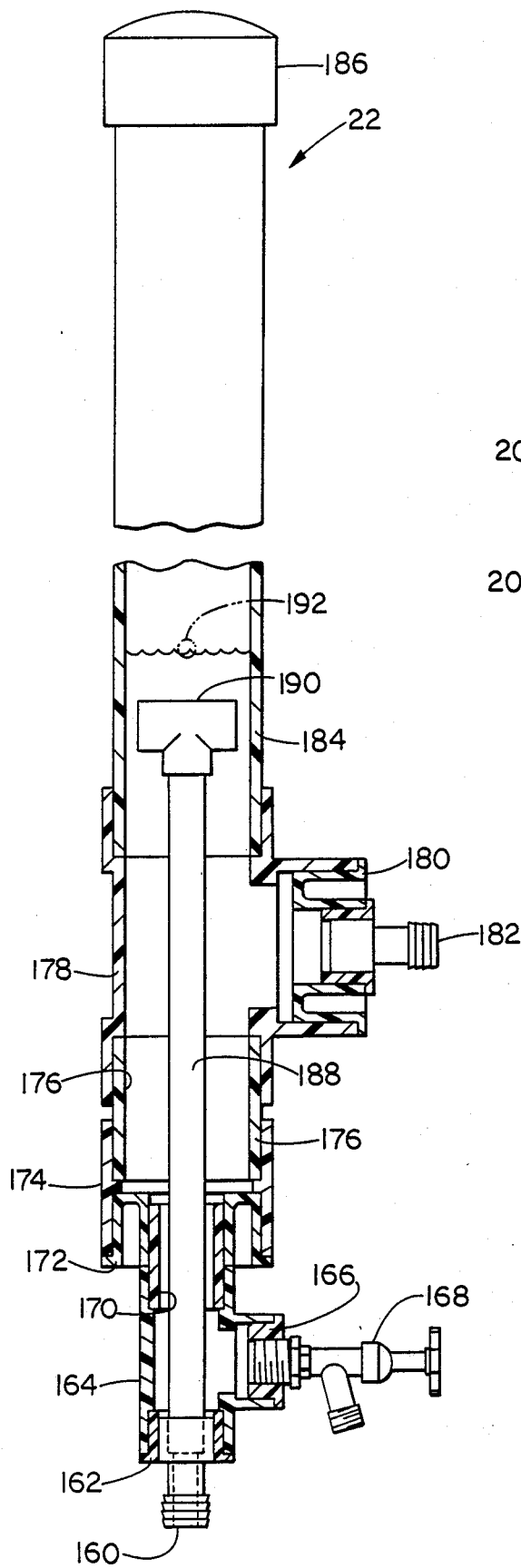
FIG. 6 is an elevational view, partially cut away, showing the construction of an accumulator/separator tank.

The tank 22 is shown in FIGS. 3 and 6. Referring specifically to FIG. 6, the tank 22 is incorporates a barbed fitting 160 at the bottom thereof, the barbed end of the barbed fitting 160 being disposed downwardly. The exterior surface of a socket end of the barbed fitting 160 is rigidly affixed into the inner diameter of a bushing 162. The bushing 162 is similarly affixed into a downwardly disposed socket end of a tee 164. A horizontally disposed branch of the tee 164 rigidly incorporates a bushing 166, the inner diameter of which is threaded to accommodate a threaded end of a faucet 168. The upwardly disposed socket of the tee 164 is rigidly affixed upon the end of a short length of pipe 170 that is in turn rigidly affixed into an inner diameter of a bushing 172. The bushing 172 is rigidly affixed into an inner diameter of a coupling 174. The upwardly extending socket of the coupling 174 is rigidly affixed upon the lower end of a short length of pipe 176 that is in turn rigidly affixed into the lower socket of a tee 178. A horizontally extending branch of the tee 178 rigidly incorporates a bushing 180 whose inner diameter rigidly receives an outer diameter of a socket end of a barbed fitting 182. The upwardly extending socket of the tee 178 is rigidly affixed upon the end of a long length of pipe 184. The upper end of the pipe 184 is closed with a cap 186 rigidly affixed thereto.

Figure 11:
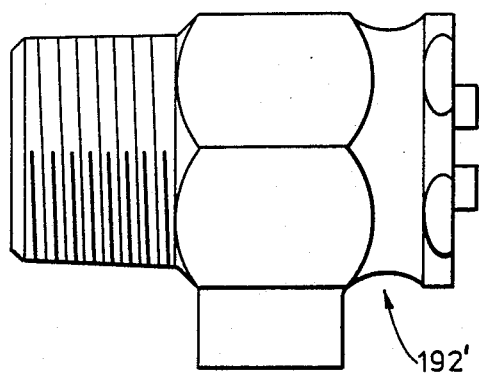
FIG. 11 is a view in side elevation of the needle valve assembly shown in FIG. 10 removed from a pipe thereof.
Figure 12:
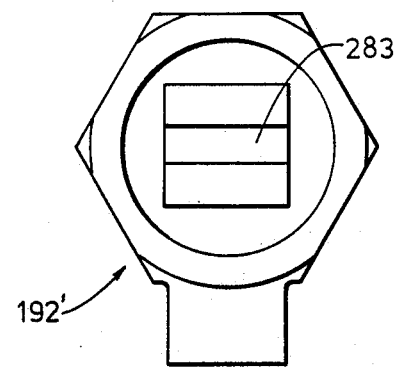
FIG. 12 is a view in end elevation of the needle valve assembly.
Figure 10:
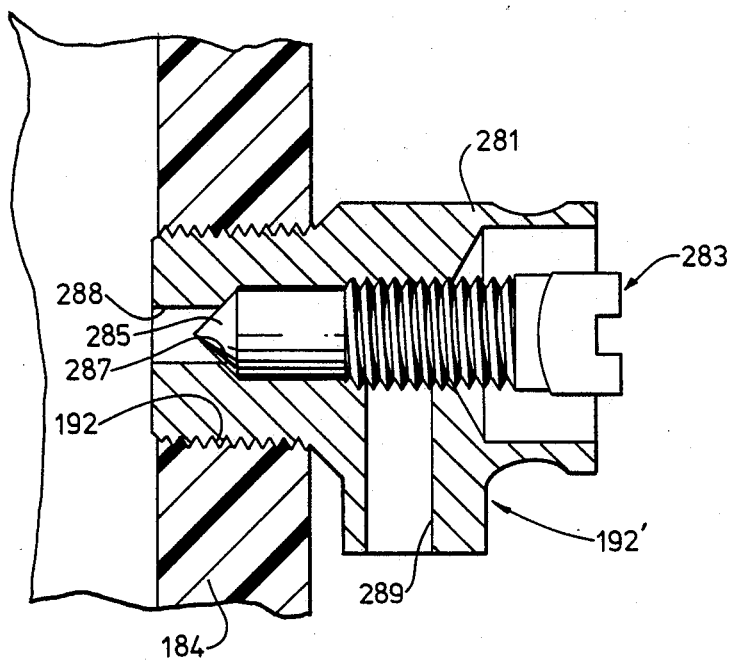
FIG. 10 is a view in section taken on an enlarged scale on the line 10—10 in FIG. 3 with a needle valve assembly in position.

Referring to the barbed fitting 160 at the bottom of the tank 22, a long length of small diameter tube 188 is rigidly affixed into the upwardly disposed socket thereof to stand uprightly within the tank 22. The upper end of the tube 188 rigidly incorporates a tee 190. An opening 192 in the wall 184 receives a needle valve assembly 192' (FIGS. 10–12). The needle valve assembly 192' includes a hollow body member 281, which is threaded in the opening 192. A needle valve member 283 is threaded in the hollow body member 281. A cone shaped valve portion 285 of the member 283 can sealingly engage valve seat 287 of the hollow body member 281 to close the needle valve assembly 192'. When the needle valve is opened that is, when valve face 285 is spaced from valve seat 287, air can be discharged from the interior of the pipe 184 through channels 288 and 289 in the hollow body member 281.

In the preferred embodiment, the inside diameter of the body of the tank 22 is approximately four inches, while the inside of the small diameter tube 188 is approximately ¾ inch.

Figure 7:
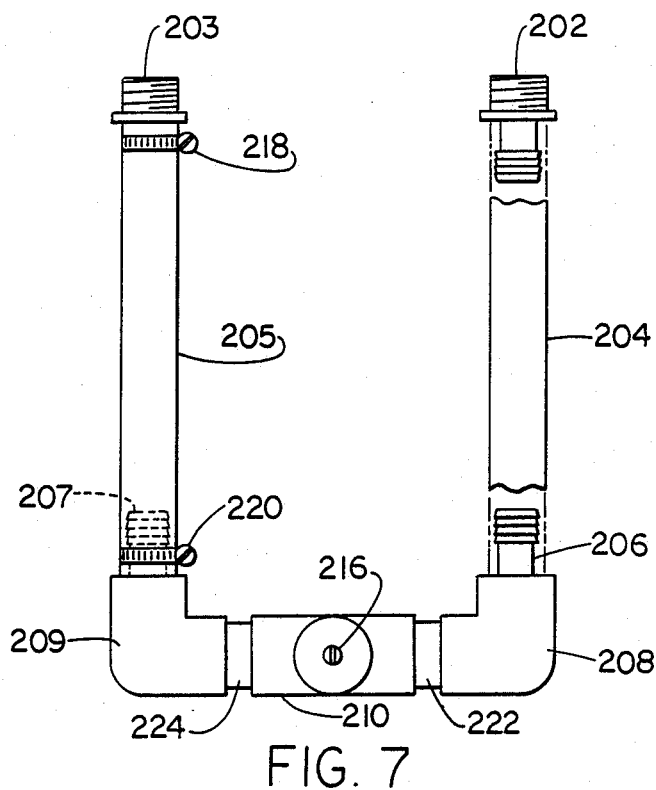
FIG. 7 is a plan view showing the cross-over/bleed assembly, a right side of the assembly being partially cut away to expose hidden features.
Figure 8:
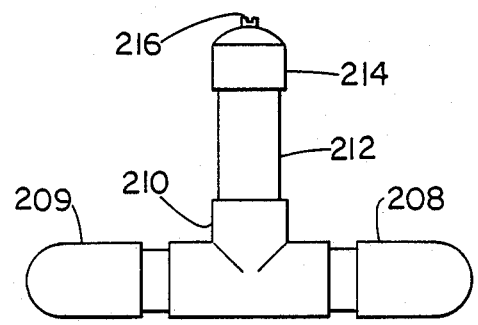
FIG. 8 is an elevational view of the cross-over/bleed assembly.

A cross-over/bleed assembly 200 is shown in FIGS. 7 and 8. It is comprised of two barb adapters 202 and 203, two hoses 204 and 205, two barb fittings 206 and 207, two elbows 208 and 209, a tee 210, a standpipe 212, a cap 214, and a needle valve 216. The barb portions of the barb adapters 202 and 203 are modified so that the hoses 204 and 205 will slip on and off the barbs relatively easily. A pair of band clamps 218, only one of which is shown, clampedly affix the rubber hoses 204 and 205 to their respective adapters. Other ends of the hoses 204 and 205 are clampedly affixed upon the barb fittings 206 and 207, respectively by band clamps 220, only one of which is shown. The outer diameters of the barb fittings 206 and 207 are rigidly affixed into sockets of the elbows 208 and 209, respectively. The previously unused socket of the elbow 208 is rigidly affixed upon the end of a short length of pipe 222 that is in turn rigidly affixed into a right hand socket of the tee 210. A left hand socket of the tee 210 is rigidly affixed upon an end of a short length of pipe 224 that is in turn rigidly affixed into the previously unused socket of the elbow 209. The standpipe 212 is rigidly affixed into the upstanding branch socket of the tee 210. The cap 214 is rigidly affixed upon the upper extremity of the standpipe 224. The needle valve 216 is threadably mounted in a vertical disposition through the top of the cap 214.

Operation

Figure 2:
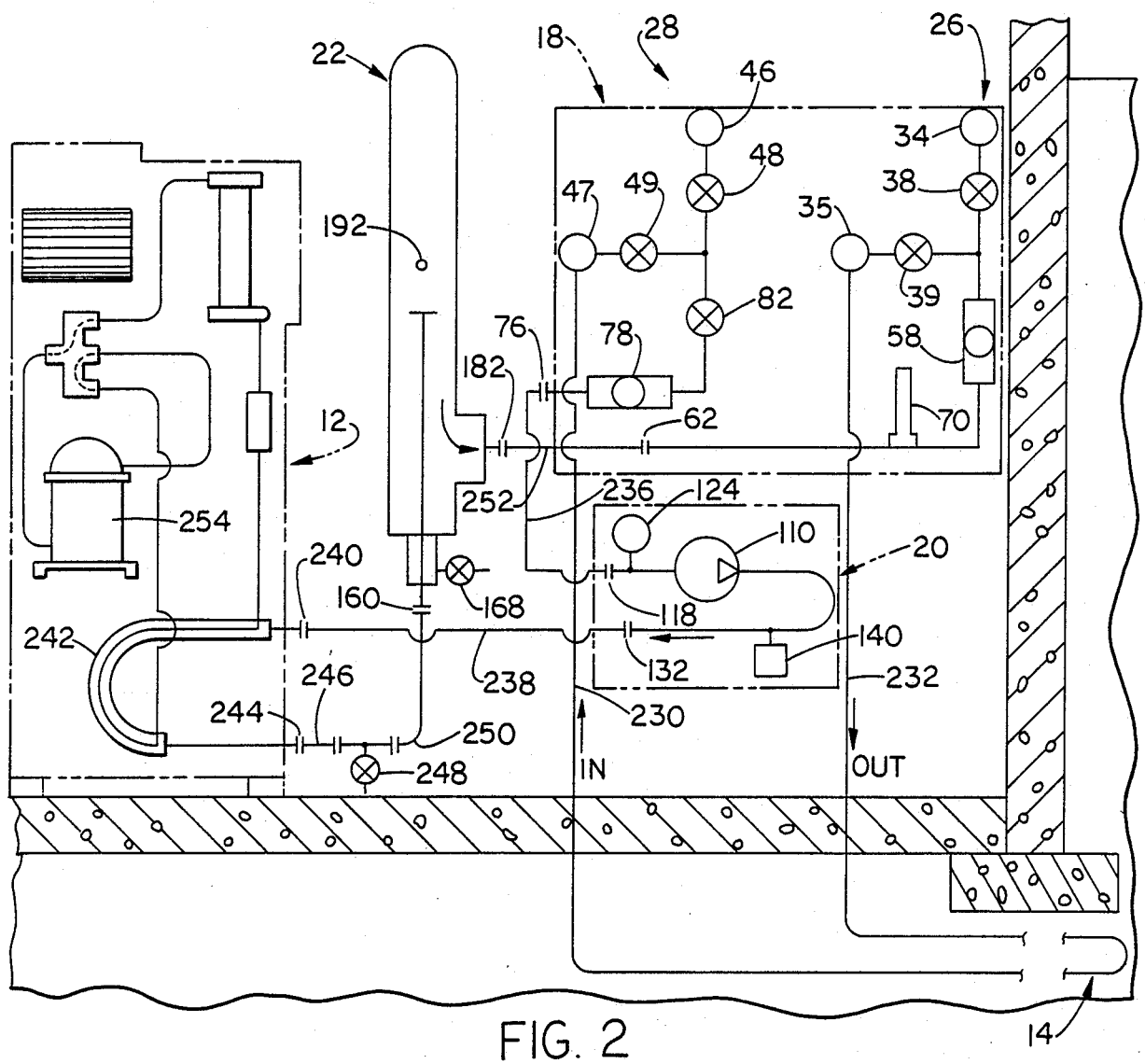
FIG. 2 is a schematic diagram of a closed loop, earth coupled, water source heat pump system, the full extent of the buried heat exchanger not being shown, a needle valve assembly being omitted.

A schematic diagram of an earth coupled water source heat pump system is shown in FIG. 2, the heat exchanger 14 having been foreshortened for convenience. In normal operation, liquid flows through the pipe 230 from the heat exchanger 14 and enters the valve console 18 through the elbow 47. The liquid passes through open valve 49 and through open valve 82 since valve 48 is closed. It continues through the tee 78 and the barb fitting 76 into a rubber hose 236. The rubber hose 236 connects to the barb fitting 118 of the pump module 20. The liquid continues past the pressure gauge 124, into the pump 110, past the pressure switch 140, and through the barb fitting 132. A rubber hose 238 connects the barb fitting 132 to an inlet fitting 240 of a water-to-freon heat exchanger. 242 or heat pump heat transfer liquid to coolant heat transfer coil inside the heat pump 12. The liquid passes through a conduit or jacket of the water-to-freon heat exchanger 242 and out an outlet fitting 244. A rubber hose 246 connects to a drain valve 248 that is in turn connected to a rubber hose 250. The rubber hose 250 connects to the barb fitting 160 of the tank 22. A rubber hose 252 connects from the barb fitting 182 of the tank 22 to the barb fitting 62 of the valve console 18. As the liquid exits the tank 22, it passes through the rubber hose 252 and enters the right hand valve assembly 26 through the barb fitting 62. Continuing to the right, the liquid passes the flow meter 70 (if used) and through the tee 68 and open valve 39 to the elbow 35 since valve 38 is closed. The liquid enters the heat exchanger 14 through the pipe 232 that is connected to the elbow 35 by an appropriate connection (not shown) and exits the building through the floor. The under floor installation is typical in new construction where the heat exchanger 14 is installed before the floor is poured. In a retrofit installation, holes can be drilled through a foundation wall to accommodate the pipes 230 and 232.

Tank Operation

Referring to FIG. 6, liquid enters the barb fitting 160 from the heat pump 12 via the rubber hose 250 and rises upwardly to the tee 190. The tee 190 turns the liquid flow to horizontal and disburses it to the right and to the left to prevent a fountain effect within the tank 22.

The operating level of the liquid in the tank 22 is determined by permitting air to escape through the needle valve 192' while the internal pressure is atmospheric. In other words, the needle valve 192' marks the lowest possible liquid level within the tank 22 at setup. For air to escape from tank 22, it would have to expand downwardly to the barb fitting 182. There are no operating or dynamic conditions that can achieve this, unlike other accumulator tanks that did not use the needle valve 192'. Note that as the internal pressure is raised, the operating level of the liquid will rise in accordance therewith.

As liquid is discharged from the tee 190, it undergoes a considerable area increase which decreases its velocity considerably. The slower velocity provides the opportunity for the fluid to drop particles to the bottom of the tank 22 adjacent the faucet 168. The slower liquid velocity also gives air bubbles a chance to rise to the top and be captured in the tank 22.

The faucet 168 serves as a drain for the right hand valve assembly 26 of the valve console 18, as a fluid and sediment sampling port, and as a convenient port for repressuring. The faucet 168 incorporates a male thread 263 that can cooperate with a standard garden hose. The process of repressurization may enter some air into the system. Using the valve 168 yields the additional benefit of capturing such unwanted air in the tank 22.

Some systems are installed with no attempt to remove construction dirt. Other systems are installed with improper or no corrosion inhibition producing corrosion particles or solid precipitates. Sealless circulator pumps are easily damaged since the liquid in the system is used to lubricate their sleeve bearings. Excessive wear or seizing of the circulator pump is the result. Seizing of the pump is a slow failure that can burden a compressor 254 in the heat pump 12, resulting in its destruction.

Pump Module Operation

The liquid passes from the tank 22 into the right hand valve assembly 26 of the valve console 18 and out and around the heat exchanger 14. The liquid returns from the heat exchanger 14 and passes through the left hand valve assembly 28 as previously described. Exiting the valve console 18, the liquid passes through the hose 236 and into barb fitting 118 of the pump module 20. The static pressure of the fluid is measured by the pressure gauge 124. This is inlet suction pressure. Most pump manufacturers publish a minimum suction pressure below which a pump impeller (not shown) will cavitate, resulting in pump damage. At setup the installer can pressurize the system to approximately 30 psi and turn on the pump 110. The drain valve 168 can be opened to reduce system static pressure, and pressure as shown by the pressure gauge 124 will begin to decrease. The pressure switch 140 is wired in series with the pump motor 146 and can be adjusted to turn the motor 146 off at the recommended minimum static pressure. The pressure switch 140 can also be wired into the heat pump electrical circuit to turn off the compressor 254 at the same time.

Valve Console Operation

In the drawings, FIGS. 1 and 2, the ground heat exchanger 14 is a simple series system. Some buried heat exchangers are not simple series systems as shown. Some can be constructed in a series of parallel loops to conserve space and increase heat transfer efficiency. The parallel loop heat exchangers generally use small diameter tubing of approximately ¾ inch inside diameter. With respect to series installations, bubbles or pockets of air out in the system will increase back pressure and decrease flow requiring excessive pumping power and varying the temperature of the liquid that the heat exchanger 14 can return to the heat pump 12. With respect to parallel installations, bubbles or pocket of air will increase back pressure and decrease flow, and can also shut off a parallel loop completely since the circulator pump does not move enough liquid to move pockets or bubbles of air.

Figure 9:
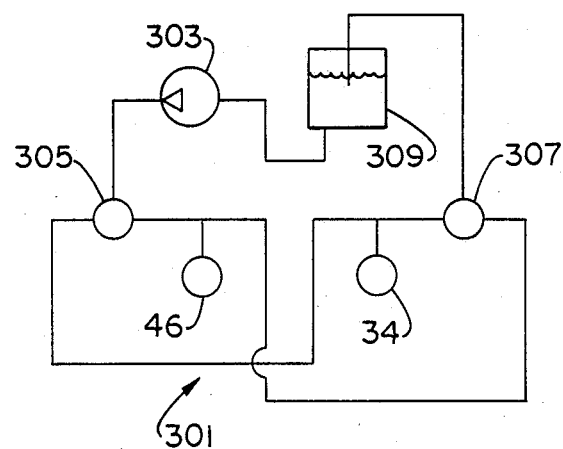
FIG. 9 is a schematic view of a charging assembly of the system.

As described previously, the right and left hand valve assemblies 26 and 28, respectively, are similar in construction. The elbows 34 and 46 are used as charging ports, while elbows 35 and 47 are used as heat exchanger ports. The valves 38 and 48 are used as system access valves and the valves 39 and 49 are used to isolate the heat exchanger 14. The tee 78 is uses as an incoming instrument port and the tee 58 is used as an outgoing instrument port. Essentially the system is comprised of two loops, a heat exchanger loop and a heat pump loop. The valves 38 and 48 provide access to both loops for installation procedures that include filling, purging, filtering, cleaning, antifreezing, and corrosion inhibition. During installation procedures, a charging assembly 301 (FIG. 9) including a large charging pump 303, reversing valves 305 and 307, and an external reservoir 309, is connected between the elbows 34 and 46. This permits pumping the system in both directions without the risk of introducing air into the system. The valve 82 shuts off the heat pump loop during purging since it is advantageous to supply full pressure and flow to the heat exchanger 14. The valve 82 limits purging flow through the heat pump loop to avoid damage to the pump 110.

Service is a different matter. It is desirable to avoid setting up the large charging pump, reversing valve, and external reservoir because it is a lengthy procedure, although some service calls may require it. Other service calls may require repressurization or liquid monitoring. This is achieved through the faucet 168 of the tank 22. A garden hose can be employed for repressurization with injected air being captured in the tank 22 as has been previously described. Finally, some service calls will require the isolation of the heat exchanger 14 by closing the valves 39 and 49. Depending upon the required service, either the faucet 168 or the drain valve 248, or both, can be opened to drain an affected area. After the service is completed, the faucet 168 can be closed, and liquid can be introduced into the drain valve 248 to refill the loop of the water-to-freon heat exchanger 242. Purging this loop without the charging assembly is very advantageous. There are two ways to achieve this with the preferred embodiment of interface equipment 16.

Open valves 38, 48 and 82. The elbows 34 and 46 are open to the atmosphere. Begin to fill the system through the drain valve 248. The valve 248 is below the heat pump heat transfer liquid to coolant heat transfer coil 242, the pump module 20 and the valve module 18. Bleed air out of the needle valve 192' of the tank 22, and continue filling so that liquid comes out the elbows 34 and 46. Because of the upstanding disposition of the right and left hand valve assemblies 26 and 28, respectively, and because they are mounted highest in the system, air will rise and the system will self purge.

Because air can stay in the pump and heat exchanger under low flow conditions, a more positive method of purging the heat pump has been sought. Referring to FIGS. 7, 8 and 3, threadably attach barb adapters 202 and 203 into elbows 34 and 46, respectively. Slip hoses 204 and 205 onto the barb fittings 202 and 203 and secure with the pair of clamps 218. Having filled the system most of the way as discussed in the previous paragraph, turn the circulator pump 110 on. Open bleed valve 216 of the cross-over assembly 200 and circulate fluid until all air has been captured in the standpipe 212 and removed by bleed valve 216.

The interface equipment illustrated in the drawings and described above is subject to structural modification without departing from the spirit and scope of the appended claims.

Having described our invention, what we want to claim by letters patent is:

1. An interface assembly for a heat pump and an elongated ground heat exchanger which comprises first valve means connected to an end of the ground heat exchanger through which heat transfer liquid enters the ground heat exchanger, second valve means connected to an end of the ground heat exchanger through which the heat transfer liquid leaves the ground heat exchanger, there being a coolant to heat transfer liquid heat exchanger in the heat pump having a heat transfer liquid conduit, a tank column, pump means, and means connecting the pump means, the conduit and the tank column in series between the second valve means and the first valve means, the tank column including an enclosed upright casing, a standpipe mounted at a lower end portion of the casing and extending upwardly of the casing, a vent in the casing spaced above an upper end of the standpipe for releasing of air from the tank column, there being a space between the casing and the standpipe for receiving particulate material, means for withdrawing the particulate material from said space, means for introducing liquid into the lower portion of the standpipe to be discharged into the casing at an upper end of the standpipe, and means for withdrawing the liquid opposite the standpipe.

2. An interface assembly as in claim 1 which includes means for introducing heat transfer liquid below the conduit, the tank column and the pump, and in which the tank column includes means for bleeding air from liquid therein.

3. The interface assembly as in claim 1 which includes means for withdrawing air from above the first and second valve means.

4. An interface assembly as in claim 3 in which the column includes an enclosed upright casing, the means for withdrawing air includes a standpipe mounted in the casing and connected between the first valve means and the second valve means, the standpipe having a discharge into the casing at an upper end portion of the standpipe, and there is an air bleeding fitting in the casing above the discharge of the standpipe.

5. An interface assembly for connecting an elongated ground heat exchanger to a heat pump which comprises a valve assembly module and a pump module, the valve assembly module comprising a first valve means through which a heat transfer liquid flows into the elongated ground heat exchanger, a second valve means through which the heat transfer liquid flows out of the elongated ground heat exchanger, a third valve means, means, for connecting liquid flow from the second valve means to the third valve means, means for connecting liquid flow from the third valve means to the pump module, a heat pump heat transfer liquid to coolant heat transfer coil, means for connecting liquid flow from the pump module to the heat pump heat transfer liquid to coolant heat transfer coil, means for connecting the heat pump heat transfer liquid to coolant heat transfer coil to the first valve means, in series, a fourth valve means for entering a connection means between the second valve means and the third valve means, fifth valve means for entering connection means between the heat pump heat transfer liquid to coolant heat transfer coil and the first valve means, the fourth and fifth valve means being located above the heat pump heat transfer liquid to coolant heat transfer coil and the pump module for bleeding air from the heat pump heat transfer liquid to coolant heat transfer coil, the pump module, the valve module and the connecting means, and a detachable fluid conduit means between the fourth valve means and the fifth valve means for circulating heat transfer liquid from the fourth valve means to the pump module, the heat pump heat transfer liquid to coolant heat transfer coil, and the fifth valve means by means of the pump module while the first valve means and the second valve means are closed, the detachable conduit means including a standpipe and an air bleed valve for collecting and bleeding air from the interface assembly.

6. An interface assembly as in claim 5 which includes means for introducing heat transfer liquid into the means for connecting liquid flow below the heat pump heat transfer liquid to coolant heat transfer coil, the pump module, and the valve assembly module.

7. An interface assembly for connecting an elongated ground heat exchanger to a heat pump comprising a valve assembly module, a separator tank module, and a pump module, the valve assembly module comprising a first valve means through which heat transfer liquid flows into an elongated ground heat exchanger, a second valve means through which the heat transfer liquid flows out of the elongated ground heat exchanger, a third valve means, means connecting liquid flow from the second valve means to the third valve means, from the third valve means to the pump module, from the pump module to a heat pump transfer liquid to coolant heat transfer coil, from the heat pump heat transfer liquid to coolant heat transfer coil to the separator tank module, and from the separator tank module to the first valve means, in series, a fourth valve means for entering the connecting means between the second valve means and the third valve means, and fifth valve means for entering the connecting means between the separator tank module and the first valve means, the fourth and fifth valve means being located above the heat pump transfer liquid to coolant heat transfer coil, the pump module, and the separator tank module for bleeding air from the heat pump heat transfer liquid to coolant heat transfer coil, the pump module, and the connecting means, the separator tank module also including an enclosed upright casing, a standpipe mounted at a lower end portion of the casing and extending upwardly of the casing, a vent in the casing spaced above an upper end of the standpipe for releasing air from the tank casing, there being a space between the casing and the standpipe for receiving particulate material from the lower portion f the tank casing, and a valve means at the lower end portion of the casing for entering liquid into the separator tank module and for extracting liquid and sediment from the separator tank module.

8. An interface assembly as in claim 7 which includes means for introducing heat transfer liquid into the connecting means below the heat pump heat transfer liquid to coolant heat transfer coil, the pump module, the separator tank module and the valve assembly module.

9. An interface assembly for connecting an elongated ground heat exchanger to a heat pump comprising a valve assembly module, a separator tank module, and a pump module, the valve assembly module comprising a first valve means through which heat transfer liquid flows into an elongated ground heat exchanger, a second valve means through which the heat transfer liquid flows out of the elongated ground heat exchanger, a third valve means, means connecting liquid flow from the second valve means to the third valve means, from the third valve means to the pump module, from the pump module to a heat pump transfer liquid to coolant heat transfer coil, from the heat pump heat transfer liquid to coolant heat transfer coil to the separator tank module, and from the separator tank module to the first valve means, in series, a fourth valve means for entering the connecting means between the second valve means and the third valve means, and fifth valve means for entering the connecting means between the separator tank module and the first valve means, the fourth and fifth valve means being located above the heat pump transfer liquid to coolant heat transfer coil, the pump module, and the separator tank module for bleeding air from the heat pump heat transfer liquid to coolant heat transfer coil, the pump module, and the connecting means, a detachable fluid conduit means between the fourth valve means and the fifth valve means for circulating heat transfer liquid from the fourth valve means to the pump module, the heat pump heat transfer liquid to coolant heat transfer coil, and the fifth valve means by means of the pump module while the first valve means and the second valve means are closed, the detachable conduit means including a standpipe and an air bleed valve for collecting and bleeding air from the interface assembly.

10. An interface assembly as in claim 9 which includes means for introducing heat transfer liquid into the connecting means below the heat pump heat transfer liquid to coolant heat transfer coil, the pump module, the separator tank module and the valve assembly module.

* * * * *